United States Patent [19]
Jang

[11] Patent Number: 5,567,311
[45] Date of Patent: Oct. 22, 1996

[54] WATER PURIFIER WITH ELECTRICAL COMPONENTS ISOLATED FROM LEAKED WATER

[75] Inventor: Jae-Young Jang, Suwon, Rep. of Korea

[73] Assignee: Samsung Electronics Co., Ltd., Suwon, Rep. of Korea

[21] Appl. No.: 552,490

[22] Filed: Nov. 9, 1995

[30]  Foreign Application Priority Data

Nov. 14, 1994 [KR] Rep. of Korea ................. 94-30238 U

[51] Int. Cl.⁶ .................................................. B01D 35/30
[52] U.S. Cl. ...................... 210/243; 210/248; 210/257.1; 210/258; 210/416.3; 210/455; 210/460; 361/215; 361/600
[58] Field of Search .................. 361/1, 142, 215, 361/600, 829, 535, 536, 537, 437; 210/243, 248, 257.1, 257.2, 282, 287, 321.6, 416.1, 416.3, 435, 455, 258, 460

[56]  References Cited

U.S. PATENT DOCUMENTS

| | | | |
|---|---|---|---|
| 4,151,090 | 4/1979 | Fava | 210/243 |
| 4,288,323 | 9/1981 | Brigante | 210/243 |
| 4,762,613 | 8/1988 | Snowball | 210/243 |
| 4,994,184 | 2/1991 | Thalmann et al. | 210/257.2 |
| 5,004,535 | 4/1991 | Bosko et al. | 210/257.2 |
| 5,108,590 | 4/1992 | DiSanto | 210/257.2 |
| 5,296,148 | 3/1994 | Colangelo et al. | 210/257.2 |
| 5,445,729 | 8/1995 | Monroe et al. | 210/257.2 |

*Primary Examiner*—W. L. Walker
*Attorney, Agent, or Firm*—Burns, Doane, Swecker & Mathis, L.L.P.

[57]  ABSTRACT

A water purifier includes a plurality of filter members, and a water storage tank disposed horizontally adjacent the filter members. The filter members and water storage tank are disposed in a housing, and a base plate is disposed below the housing to form a space which extends beneath the water storage tank and the filter members. An electric pump, electric transformer, and circuit board are disposed in a first section of the space which is disposed beneath the water storage tank. To shield those electric elements from leaking water, a first wall projects downwardly into the space, and a second wall projects upwardly into the space. The walls separate the first section of the space from a second section of the space which is disposed beneath the filtering members. The first wall isolates downwardly dripping water from accessing the first section, and the second wall prevents sitting water on the base plate from accessing the first section.

9 Claims, 4 Drawing Sheets

WATER PURIFIER WITH ELECTRICAL COMPONENTS ISOLATED FROM LEAKED WATER

BACKGROUND OF THE INVENTION

1. Field of the Invention

The present invention relates to a reverse osmotic water purifier which can eliminate organic chemical materials and heavy metals such as chlorine substances and the like, various cancer-causing materials and the like, and odor causing substances such as toxic gas and the like contained in the potable water to thereby enable hygienic water disposal, and more particularly to a water purifier which can prevent electrical elements therein from being short-circuited by dripping water drops and leaked water.

b 2. Description of the Prior Art

Generally, there have been lots of different types of water purifiers for removing pollutant substances contained in the potable water (hereinafter referred to as water) according to methods for purifying the water, and a reverse osmotic water purifier has been widely used, which serves to add pressure to the water and to cause the same to pass through an artificial osmotic membrane for water purifying, so that heavy metals, bacteria, cancer-causing materials and the like contained in the water can be removed, thereby emitting pure water and dissolved oxygen only.

In other words, the reverse osmotic water purifier, as illustrated in FIGS. 1 and 2, includes pre-process filtering means 30 for being disposed at a left upper rear side of body 10 in order to eliminate harmful organic chemical substances such as chlorine components and the like contained in the water supplied through a water supply pipe 20 connected to a faucet (B), a pressure pump 40 for forcibly adding pressure to the water which has passed the pre-process filtering means 30, membrane filtering means 50 for being provided at an upper central rear side of the body 10 in order to remove various heavy metals, cancer-causing materials and the like contained in the water supplied from the pressure pump 40, a concentrated water pipe 60 for being arranged at a lower area of the membrane filtering means 50 in order to discharge concentrated (unfiltered) water generated at the membrane filtering means 50, post-process filtering means 70 for being equipped at a right upper rear side of the body 10 in order to eliminate odor or harmful gaseous component smeared into the water supplied from the membrane filtering means 50, a water purifying tank 80 for being disposed at a front upper area of the body 10 in order to store the water supplied from the post-process filtering means 70, a disposal valve for being installed at a lower front area of the water purifying tank 80 in order to dispense the purified water from the purified water tank 80 by way of a valve pressing operation, and a base plate 120 for being provided at a lower area of the body 10 so that a high voltage transformer 100 can be mounted alongside the pressure pump 40, and at the same time, a circuit substrate 110 can be accomodated.

At this time, a filtering case 130 is fixedly coupled to a central rear area of the body 19, so that the pre-process filtering means 30, membrane filtering means 50 and the post-process filtering means 70 can be vertically inserted thereinto.

The body 10 is fixedly coupled at two vertical edges of a rear end thereof to a rear cover 140 in order to prevent the filtering case 130 and other electrical components from being damaged from the outside and to provided a more attractive enclosure.

An easily releasable upper case cover 150 is disposed between the rear surface of the body 10 and the rear cover 140 so as to cover an upper area of the filtering case 130.

In addition, connecting pipes 160 are respectively connected among the pre-process filtering means 30, pressure pump 40, membrane filtering means 50, post-process filtering means 70 and the water purifying tank 80 so as to guide the flow of the water.

Member 170 in the drawing is a gutter for gathering dripping water and for receiving a water-receiving vessel.

According to the reverse osmotic water purifier thus constructed, when the water supplied from the faucet B is supplied to the pre-process filtering means 30 by way of the water supply pipe 20, the water passes through the pre-process filtering means 30 of carbon-filtered material to thereby be separated from organic chemical materials such as chlorine substances and the like contained in the water and at the same time, to thereby be supplied to the pressure pump 40 connected to the pre-process filtering means 30.

The water pressurized to a predetermined level by the operation of the pressure pump 40 is supplied to and passes through the membrane filtering means 50, to thereby be separated from various heavy metals, cancer-causing materials and the like by osmotic membrane filter and then is supplied to and passes through the post-process filtering means 70 in which a carbon filter removes odor or toxic gas smeared in the water.

The water purified at the post-process filtering means 70 is thereafter stored in the storage tank 80. Concentrated (unfiltered) water is repeatedly discharged from the membrane filtering means 50 to the outside by way of a concentrated water pipe 60 disposed at a lower side of the membrane filtering means 50, thereby preventing the filter from being excessively polluted and prolonging the life of the water purifier and supplying pure and clean water.

However, there is a problem in that leaked water from the connecting pipe 150 or dripping water generated from exchanges of the filtering means 30, 50 and 70 directly penetrates upper areas of the electric parts, to thereby cause electrical accidents such as short circuits (by way of example, leakage of electricity, electric shock), because electric components such as the pressure pump 40, high voltage transformer 100 and the like are disposed on a flat surface of the water purifier and because there is no structure to isolate the electrical components from the pre-process filtering means 30, membrane filtering means 50 and the post-process filtering means

SUMMARY OF THE INVENTION

Accordingly, the present invention is disclosed to solve the afore-mentioned problem and it is an object of the present invention to provide a water purified by which the electrical components thereof can be avoided from being short-circuited by dripping water and leaked water to thereby prevent electrical safety hazards beforehand.

The water purifier according to the present invention for removing various pollution-causing materials and odor contained in the water by way of a plurality of filtering means comprises:

a body;

a base plate; and an accommodating Unit disposed in a facing direction against the plurality of filtering means by way of combination of said body with said base plate so as to prevent from being short-circuited by water drops and leaked water generated from the plurality of filtering means infusing into a pressure pump, a high voltage transformer and a circuit substrate.

BRIEF DESCRIPTION OF THE DRAWINGS

Other objects and aspects of the invention will become apparent from the following detailed description of an embodiment thereof with reference to the accompanying drawings in which.

DETAILED DESCRIPTION OF THE PREFERRED EMBODIMENT OF THE INVENTION

Figure 1:
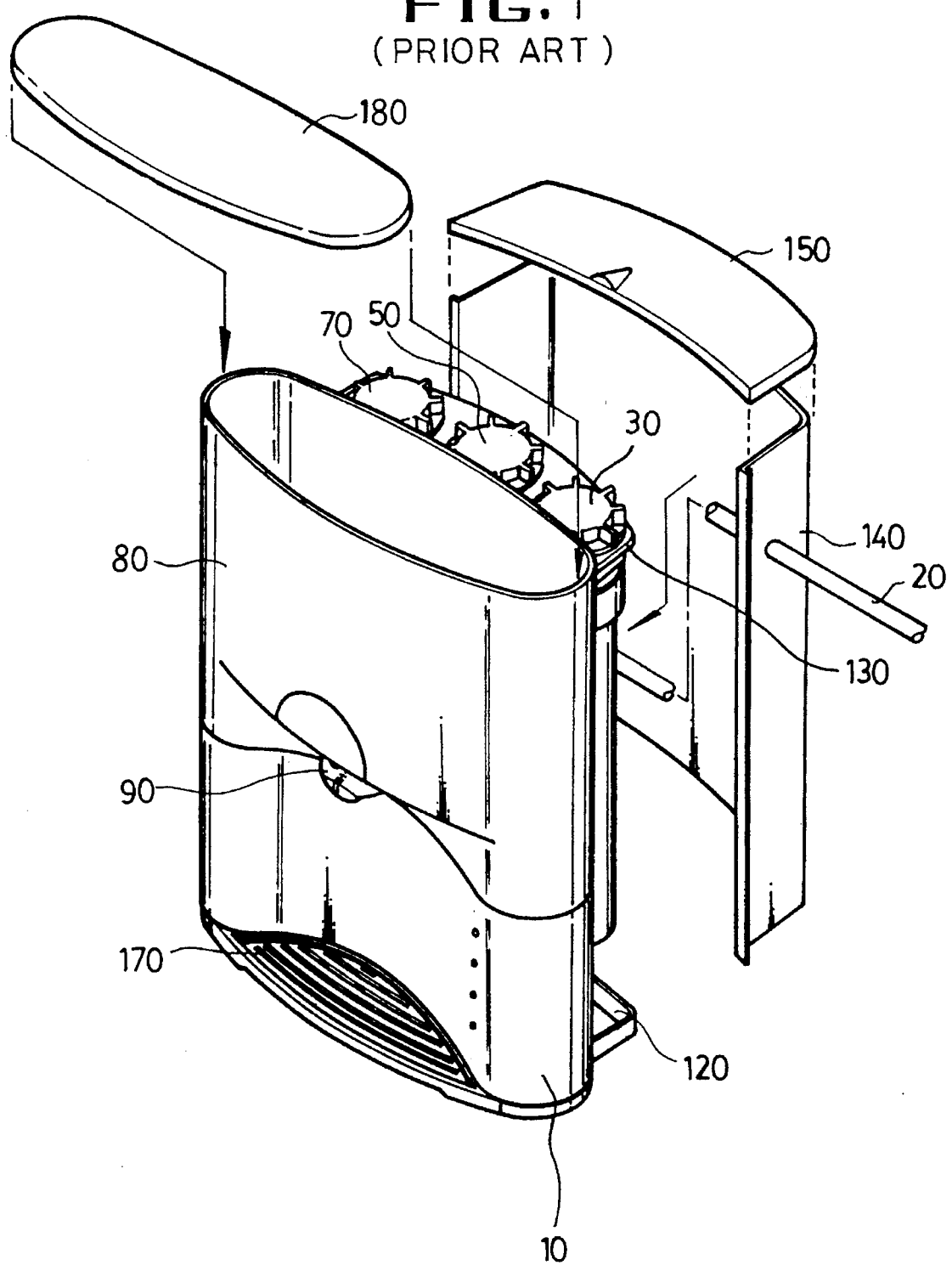
FIG. 1 is an exploded prespective view of a water purifier according to the prior.
Figure 2:
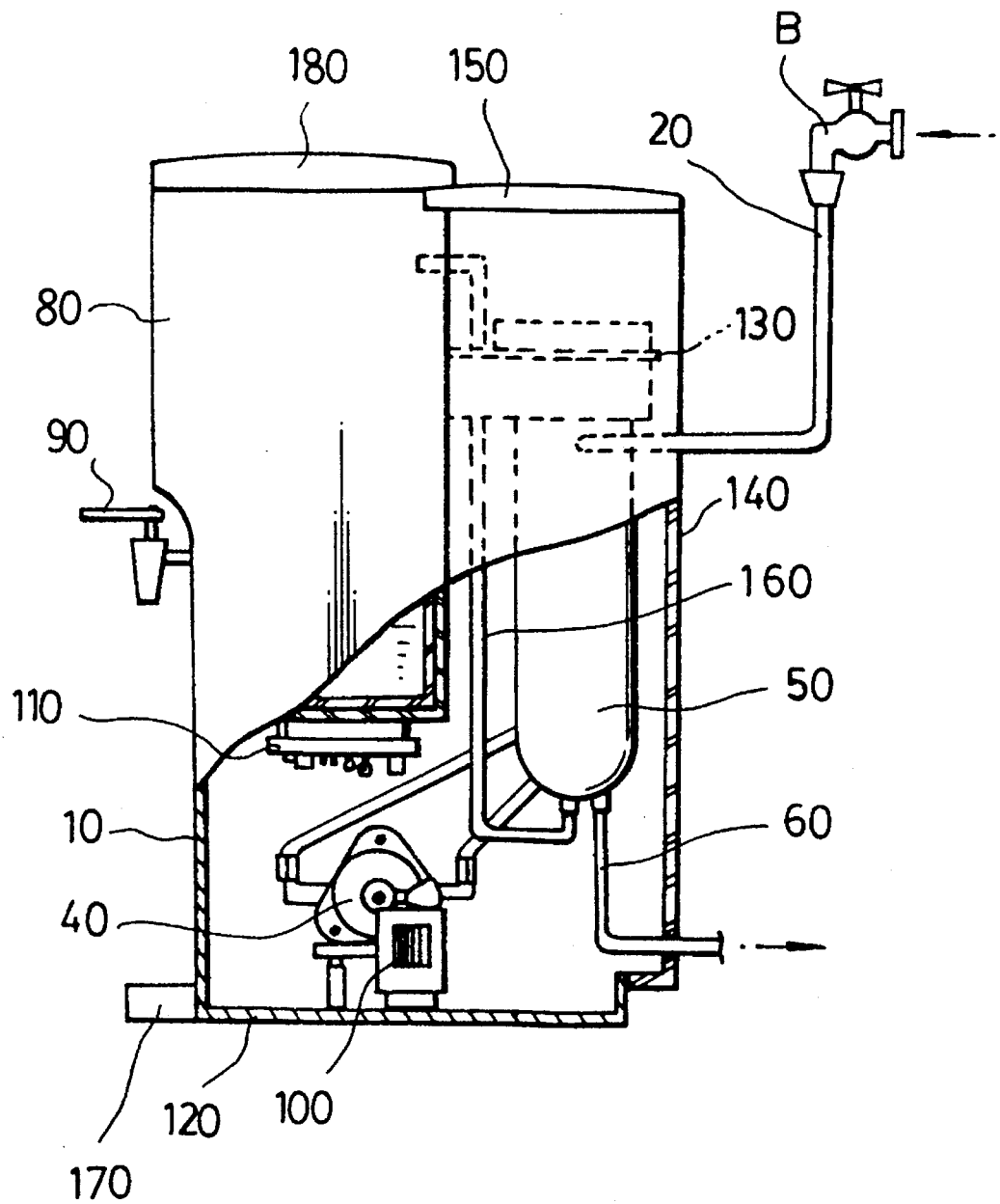
FIG. 2 is a partially cutaway side view of the water purifier according to the prior art for illustrating how some of electrical components are disposed therein.

The embodiment of the present invention will now be described in detail with reference to the accompanying drawings.

Throughout the drawings, like reference numerals and symbols are used for designation of like or equivalent parts or portions for simplicity of illustration and illustration and detailed description thereof is omitted.

Figure 3:
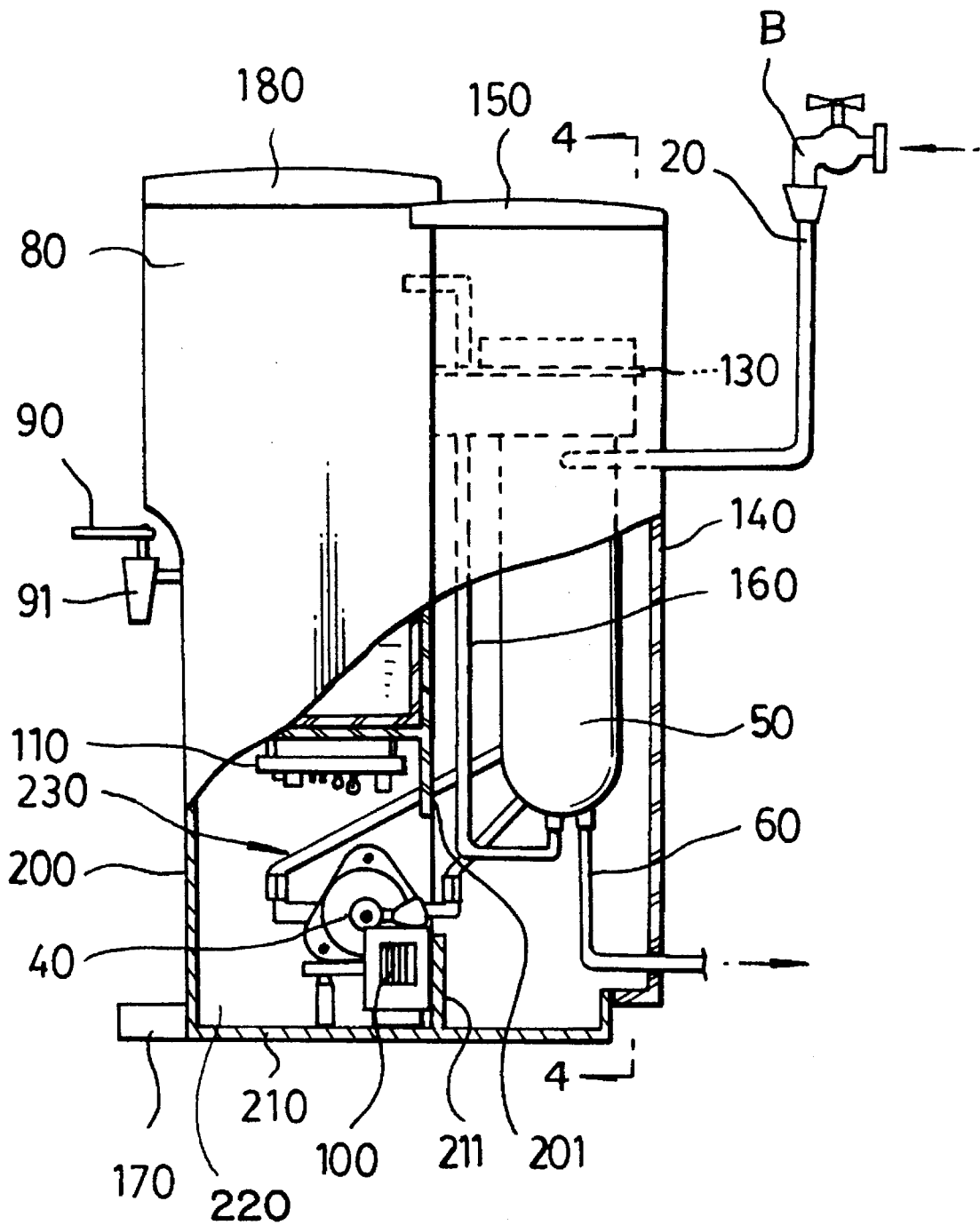
FIG. 3 is a partially cutaway side view of a water purifier according to the present invention for illustrating how some of electrical components are disposed therein.

FIG. 3 is a partially cutaway side view of a water purifier according to the present invention for illustrating how some of the electrical components are disposed therein, where the water purifier includes body 200 and a rear cover 140 which forms a housing. The housing receives a plurality of filtering means 30, 50 and 70 provided through in a filtering case 130 at a rear portion of the housing so as to remove various pollution-causing materials and odor contained in the water, a storage tank 80 arranged in a front portion side of the housing so as to receive and store the water purified in the course of passing through the plurality of filtering means 30, 50 and 70, and an accommodating compartment 220 for being arranged at a lower side of the body 200 by providing of the body 200 with a base plate 210 so as to form a space that includes a front section disposed below the water tank 80, and a second section disposed beneath the filtering means 30, 50, 70. The first section receives electrical components such as pressure pump 40, high-voltage transformer 100, circuit substrate 110 and the like, and, at the same time, to prevent the electrical components from being short-circuited by the dripping water and leaked water.

At this time, the body 200 is integrally formed at a rear lower side thereof with a dripping water isolating wall 201 projecting downward in order to prevent the dripping water from being infused into the accommodating compartment 220.

In addition, the base plate 210 is integrally formed at an upper central area thereof with an isolating jaw 211 projecting upward in order to avoid the leaked water from being infused into the accommodating compartment 220.

The dripping water isolating wall 201 is positioned nearer to a rear surface of the body 200 than to the isolating jaw 211.

Figure 4:
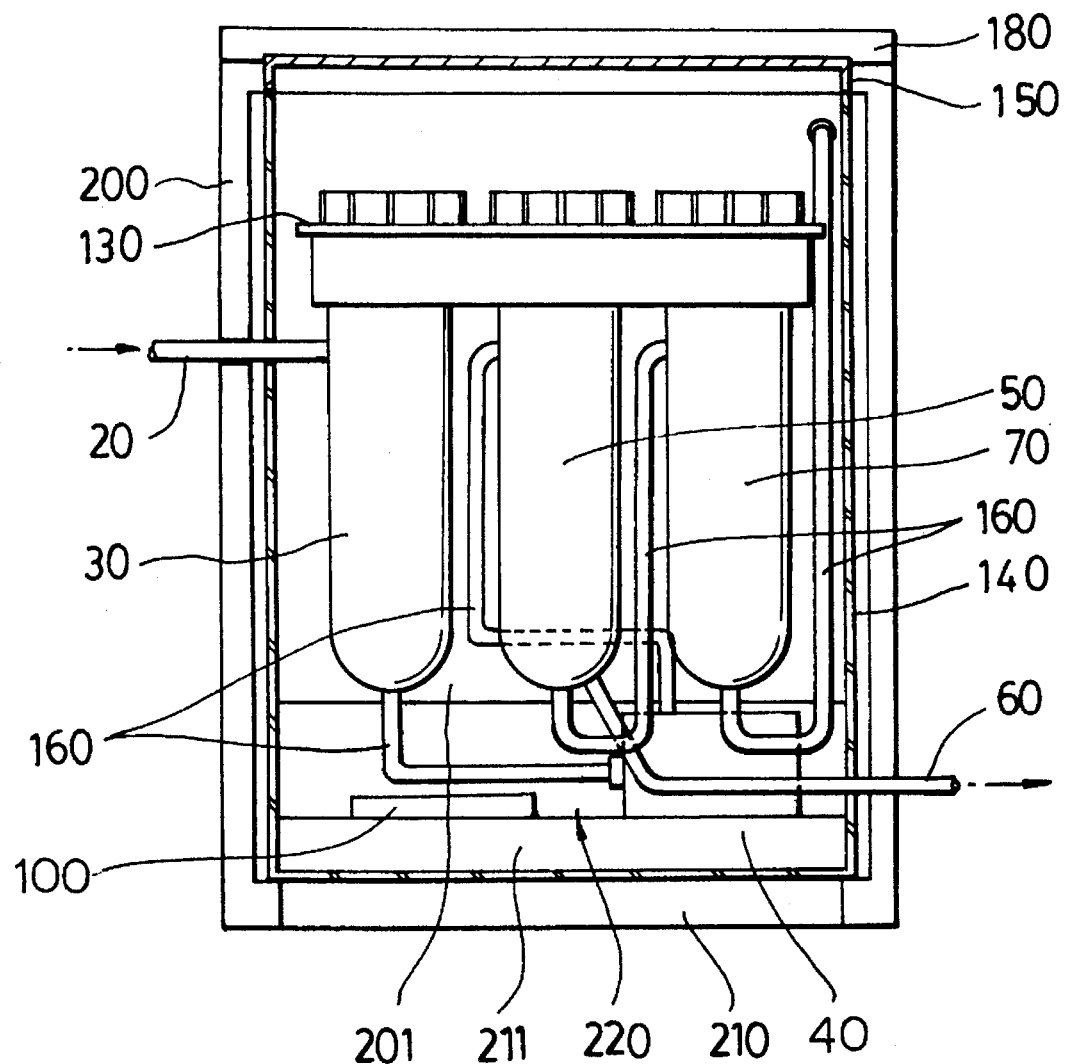
FIG. 4 is a sectional view taken along the line 4—4 in FIG. 3.

FIG. 4 is a sectional view taken along the line of 4—4 in FIG. 3. The body 200 is fixedly coupled to the filtering case 130 so that the pre-process filtering means 30, membrane filtering means 50 and the post-process filtering means 70 can be vertically inserted from the top thereof.

The body 200 is provide at a lower side thereof with the accommodating compartment 220 by providing the body 200 with the base plate 210 so that electrical components such as the pressure pump 40, high voltage transformer 100, circuit substrate 110 and the like can be prevented from being short-circuited by the water dripping and leaking from the plurality of filtering means 30, 50 and 70 and the connecting pipes 160.

At this time, the connecting pipes 160 are respectively arranged among the pre-process filtering means 30, pressure pump 40, membrane filtering means 50, post-process filtering means 70 and the storage tank 80 so that flow of the water can be guided, and the membrane filtering means 50 is connected at a lower side thereof with a concentrated water pipe 60 so as to drain out the concentrated (unfiltered) water generated from the membrane filtering means 50.

Meanwhile, the electrical components such as pressure pump 40, high voltage transformer 100, circuit substrate 110 and the like mounted in the accommodating compartment 220, when viewed from the rear surface of the water purifier, can be partially seen above the isolating jaw 211.

Next, the operation of the present invention thus constructed will be described.

First of all, when the water is supplied from the faucet B to the pre-process filtering means 30 through the water supply pipe 20, the water is separated from organic chemical materials such as chlorine substances and the like contained in the water, and then, is supplied to the pressure pump 40.

Subsequently, the water increased in pressure to a predetermined level by the operation of the pressure pump 40 is supplied to and passes through the membrane filtering means 50, to thereby be separated from various heavy metals, cancer-causing materials and the like by the osmotic membrane filtering method, and then, the water is supplied to and passes through the post-process filtering means 70 in which a carbon filter removes odor or toxic gas components smeared in the water. The water purified by the post-process filtering means 70 is stored in the storage tank 80.

At this time, the concentrated (unfiltered) water generated at the membrane filtering means 50 is drained out through the concentrated water pipe 60 connected at a lower side of the membrane filtering means 50.

Meanwhile, the purified water in the storage tank 80 is discharged through a dispensing outlet 91 which is opened by way of a lever 90, so that water dispensing can be made possible.

At this time, because the rear lower surface of the body 200 for being mounted with the accommodating unit 220 for being disposed thereat with the electrical components such as pressure pump 40, high voltage transformer 100, circuit substrate 110 and the like is arranged at the rear lower surface is provided with the dripping water isolating wall 201 projecting downward, a small quantity of water dripping in the course of replacing the pre-process filtering means 30, membrane filtering means 50 and the post-process filtering means 70 or dropping on the base plate 210 from jointed areas of the water supply pipe 20, concentrated water pipe 60 and the connecting pipes 150, can be prevented from being directly infused into the accommodating compartment 220, and therefore, the electrical components such as pressure pump 40, high voltage transformer 100, circuit substrate 110 and the like mounted in the accommodating unit 220 can be prevented from being short-circuited to thereby avoid in advance an electrical accident.

Furthermore, because the base plate 210 is provided at a central upper surface thereof with the isolating jaw 211, the small quantity of water leaking from the water supply pipe 20, concentrated water pipe 60 and the connecting pipes 150, or dripping in the course of replacing the pre-process filtering means 30, membrane filtering means 50 and the post-process filtering means 70 can be prevented from being infused into the accommodating compartment 220. That is, when the water drops onto the base plate 210 and is collected thereon, the electrical components disposed in the accommodating compartment 220 can be prevented from being short-circuited by the collected water, to thereby prevent in advance electrically related safety problems.

As apparent from the foregoing, the water purifier according to the present invention can prevent a small quantity of water dropping in the course of replacing the filtering means and leaking from jointed areas of the pipes from being infused into the accommodating compartment by means of the water isolating wall and the isolating jaw, and, at the same time, can prevent in advance the electrical components disposed in the accommodating compartment from being short-circuited, to thereby avoid any electrical safety hazards.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A water purifier comprising:
   a housing forming horizontally spaced first and second portions;
   a filtering mechanism including a plurality of filtering members disposed in said second portion of said housing, said filtering members interconnected by conduits for conducting water between the filtering members;
   a base plate disposed below said housing for forming a space extending across lower ends of said first and second portions, respectively, said space including first and second sections disposed in said first and second housing portions, respectively;
   an electric pump disposed in said first section of said space for pressurizing water passing through at least one of said filtering members;
   a pump-actuating mechanism disposed in said first section of said space and including a high voltage transformer and an electric circuit board operably connected to said pump; and
   a wall structure disposed between said first and second sections of said space for blocking water travel from said second section into contact with said pump, said transformer, and said circuit board.

2. The water purifier according to claim 1 wherein the wall structure includes a wall extending upwardly from the base plate at a location between said first and second sections for preventing leaked water in said second section from traveling along said base plate and into said first section.

3. The water purifier according to claim 2 wherein said wall structure comprises a wall extending downwardly within said space between said first and second sections for preventing downwardly dripping water from entering said first section.

4. The water purifier according to claim 3, further including a water storage tank disposed in said first portion of said housing above said first section.

5. The water purifier according to claim 4 wherein said circuit board is mounted on an underside of said water storage tank.

6. The water purifier according to claim 5 wherein said pump and transformer are mounted on said base-plate.

7. The water purifier according to claim 3 wherein said walls terminate at vertically spaced elevations.

8. The water purifier according to claim 7 wherein said walls are vertically aligned with one another.

9. The water purifier according to claim 1 wherein said wall structure comprises a wall extending downwardly within said space between said first and second sections for preventing downwardly dripping water from entering said first section.

* * * * *